United States Patent [19]

Barber

[11] Patent Number: 4,968,499
[45] Date of Patent: Nov. 6, 1990

[54] CONVERSION OF PRECIPITATOR DUST INTO PHOSPHORUS FURNACE FEEDSTOCK

[75] Inventor: James C. Barber, Florence, Ala.

[73] Assignee: James C. Barber and Associates, Inc., Florence, Ala.

[21] Appl. No.: 421,186

[22] Filed: Oct. 13, 1989

[51] Int. Cl.⁵ .................. C01B 25/01; C01B 25/02; C01B 25/04; C05B 7/00
[52] U.S. Cl. .................. 423/322; 423/323; 71/34
[58] Field of Search .................. 423/322, 323; 71/34

[56] References Cited

U.S. PATENT DOCUMENTS

| | | |
|---|---|---|
| 2,040,081 | 5/1936 | Curtis .................. 23/108 |
| 2,267,077 | 12/1941 | Burke .................. 23/223 |
| 3,034,883 | 5/1962 | Hignett et al. .................. 71/37 |
| 3,076,248 | 2/1963 | Darrow et al. .................. 25/156 |
| 3,104,952 | 9/1963 | Hartig .................. 23/293 |
| 3,202,744 | 8/1965 | Barber et al. .................. 264/109 |
| 3,335,094 | 8/1967 | Darby .................. 252/188.3 |
| 3,522,338 | 7/1970 | Kass et al. .................. 264/125 |
| 3,531,250 | 9/1970 | Hinz et al. .................. 23/223 |
| 3,760,048 | 9/1973 | Sullivan et al. .................. 264/56 |
| 3,923,961 | 12/1975 | Dancy .................. 423/323 |
| 4,081,333 | 3/1978 | Holmes et al. .................. 203/86 |
| 4,372,929 | 2/1983 | Barber .................. 423/323 |
| 4,373,893 | 2/1983 | Barber .................. 425/222 |
| 4,383,847 | 5/1983 | Barber .................. 71/34 |
| 4,421,521 | 12/1983 | Barber .................. 44/16 R |
| 4,451,277 | 5/1984 | Barber .................. 71/36 |
| 4,481,176 | 11/1984 | Dodson et al. .................. 423/322 |
| 4,492,627 | 1/1985 | Crea .................. 209/3 |
| 4,514,366 | 4/1985 | Barber .................. 423/318 |
| 4,529,439 | 7/1985 | Barber .................. 71/10 R |
| 4,608,241 | 8/1986 | Barber .................. 423/317 |
| 4,649,035 | 3/1987 | Barber .................. 423/317 |
| 4,656,020 | 4/1987 | Barber .................. 423/322 |
| 4,670,240 | 6/1987 | Barber .................. 423/322 |
| 4,783,328 | 11/1988 | Finley et al. .................. 423/323 |
| 4,806,326 | 2/1989 | Finley .................. 423/322 |
| 4,822,583 | 4/1989 | Finley et al. .................. 423/322 |

FOREIGN PATENT DOCUMENTS

| | | |
|---|---|---|
| 956433 | 10/1974 | Canada .................. 423/323 |
| 850576 | 7/1981 | U.S.S.R. . |
| 981420 | 1/1965 | United Kingdom .................. 23/223 |

OTHER PUBLICATIONS

Barber, "Solid Wastes from Phosphorus Production", *Solid Wastes*, 1975, pp. 929–947.
Barber et al, "A Waste Recovery Story", Chemtech, May 1986, pp. 298–302.

*Primary Examiner*—Gregory A. Heller
*Attorney, Agent, or Firm*—James J. Brown

[57] ABSTRACT

A process is disclosed for converting precipitator dust obtained during production of elemental phosphorus into feedstock for the submerged-arc electric furnace. Precipitator dust is agglomerated and indurated to prepare furnace feedstock. A binder is made by reacting acidic phosphorus compounds with alkaline substances. The preferred acidic phosphorus compound is phosphoric acid, and the preferred alkaline substance is ground phosphate ore. Precipitator dust is tumbled with the binder to form agglomerates, and the agglomerates are then indurated by heating. Gases evolved during preparation of binder, agglomeration of precipitator dust, and induration of the agglomerates are scrubbed with an aqueous medium having a pH in the range of 5.5 to 6.0. Scrubber effluent is used as feedstock for the production of suspension fertilizer. The indurated agglomerates are smelted in a submerged-arc electric furnace.

8 Claims, 1 Drawing Sheet

PROCESS FOR CONVERTING PRECIPITATOR DUST
INTO PHOSPHORUS FURNACE FEEDSTOCK

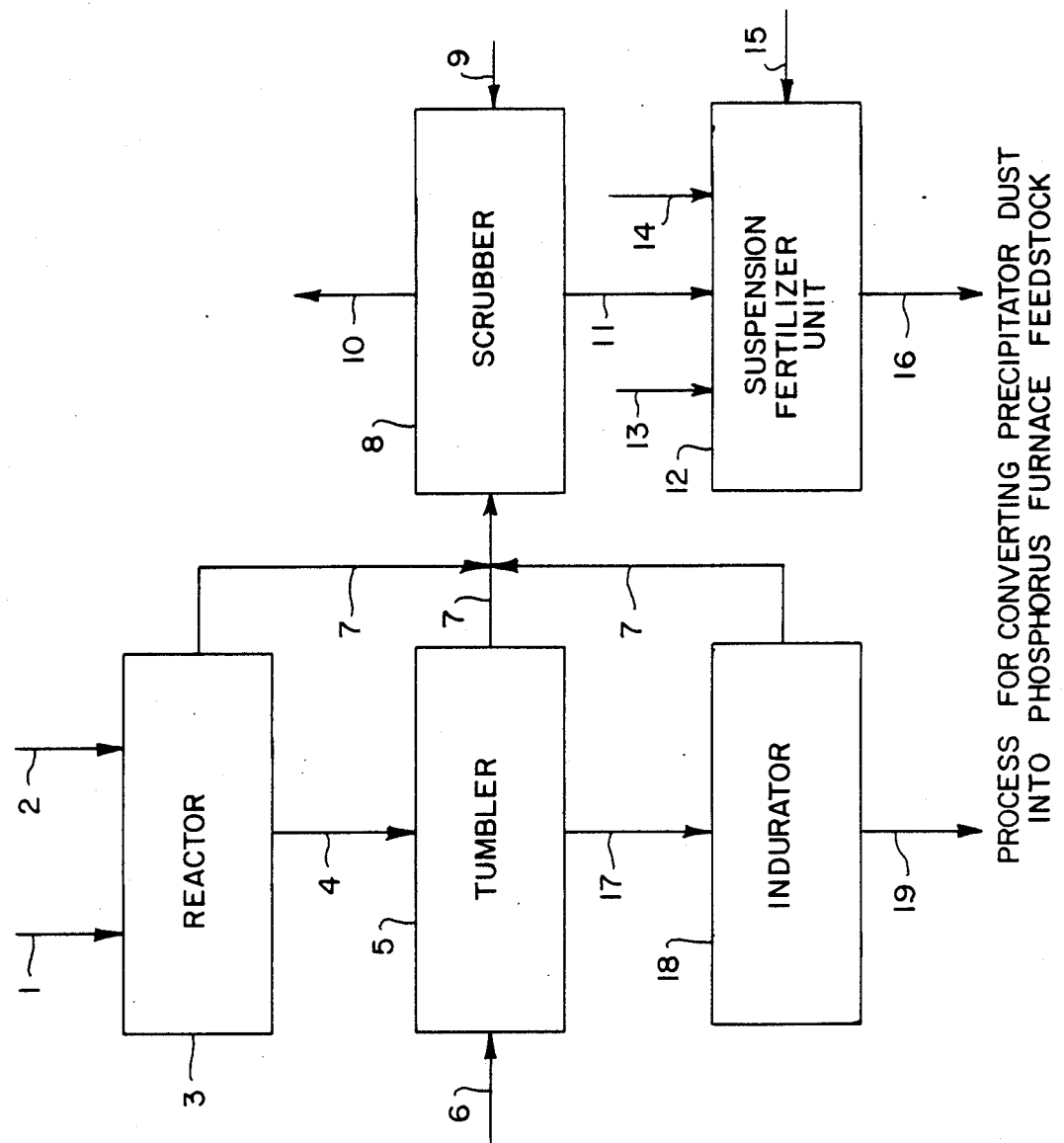

CONVERSION OF PRECIPITATOR DUST INTO PHOSPHORUS FURNACE FEEDSTOCK

BACKGROUND OF THE INVENTION

Elemental phosphorus was produced by the Tennessee Valley Authority (TVA) at Muscle Shoals, Alabama, by a process consisting of the following steps.
1. Phosphate ore was partially dried.
2. Partially dried ore was agglomerated, and the agglomerates were indurated by heating.
3. Indurated agglomerates were used as feedstock for production of elemental phosphorus. Other furnace feed materials were metallurgical coke and silica rock.
4. Mixture of agglomerated phosphate ore, metallurgical coke, and silica rock was smelted in electric furnaces.
5. Gases evolved from electric furnaces and particulates in gases were removed from said gases by treating in electrostatic precipitators. Particulates collected in this manner are a waste called precipitator dust.
6. Cleaned gases were cooled to condense elemental phosphorus.

The quantity of precipitator dust collected was about 0.06 ton per ton of elemental phosphorus produced. Analysis of the precipitator dust on a dry basis is given in table 1.

TABLE 1

| Composition of Precipitator dust | |
|---|---|
| | Percent, dry basis |
| $P_2O_5$ | 27.7 |
| CaO | 13.8 |
| $SiO_2$ | 17.3 |
| $Fe_2O_3$ | 1.7 |
| $Al_2O_3$ | 3.6 |
| F | 6.3 |
| $K_2O$ | 17.4 |
| MgO | 0.9 |
| $MnO_2$ | 0.1 |
| $Na_2O$ | 3.1 |
| S | 0.1 |
| Total | 92.0 |

In addition to constituents shown in table 1, precipitator dust may contain up to 1.2 percent elemental phosphorus, depending on the temperature of dust as it is discharged from the electrostatic precipitator. When the dust temperature is 900° F., or higher, the precipitator dust will contain essentially no elemental phosphorus. However, the gas temperature at the precipitator inlet is normally in the range of 650° to 700° F. and the average elemental phosphorus content of the dust is in the range of 0.1 to 0.3 percent.

Precipitator dust has potential value as a fertilizer because it contains relatively high percentages of $P_2O_5$ and $K_2O$, both of which are nutrients. An endeavor was made to convert the waste into granular fertilizer by oxidizing the elemental phosphorus with air, granulating the phosphorus-free material, bagging the granules, and distributing the material on agricultural land.

Unfortunately, elemental phosphorus was not readily oxidized. Since the element ignites spontaneously, its presence in a fertilizer is a safety hazard. Paper bags containing granulated precipitator dust ignited, and it was evident the presence of unoxidized elemental phosphorus was a fire hazard. The project to recover precipitator dust as granular fertilizer was abandoned at TVA.

Large-scale production of elemental phosphorus began at TVA in 1934 at a fertilizer research facility now called the National Fertilizer Development Center (NFDC). The first electrostatic precipitator was installed on a phosphorus production unit in 1939 and precipitators were subsequently installed on all the production units. TVA discontinued production of elemental phosphorus in 1976 and production units have been dismantled.

All precipitator dust produced at NFDC is in storage piles exposed to the weather except for that recovered as fertilizer. It is estimated 17,000 tons is stored at NFDC. Since elemental phosphorus is an acutely toxic chemical, and runoff from precipitation is a potential pollution problem, continued storage of the waste in outside piles does not appear to comply with the 1984 Amendments to the Resource Conservation and Recovery Act (public law 99-499).

Heretofore the only means of disposing of the phosphorus-containing precipitator dust would be the following two-step process.
1. Incineration in a facility approved by the Environmental Protection Agency (EPA).
2. Disposal of the residue in a secure landfill as stipulated by the 1984 Amendments to the Resource Conservation and Recovery Act.

Disposal of the waste by the two-step process will be costly. Furthermore, placement in a landfill is the least desirable option of the various methods for waste disposal. A waste minimization process was sought which would be less costly than incineration and landfilling. Also, a waste minimization method such as recovery or recycle is preferred over incineration or landfilling.

DISCLOSURES IN THE INVENTION

Elemental phosphorus is normally produced by smelting a mixture of phosphate ore, metallurgical coke, and silica rock in a submerged-arc electric furnace. A gas mixture is generated in the furnace which consists of carbon monoxide, hydrogen, and elemental phosphorus. In one modification of the production process the gas mixture is treated in electrostatic precipitators to remove particulates and, after cleaning, the gas is cooled to condense elemental phosphorus. Precipitator dust is collected, and it is a hazardous waste. But at some furnaces electrostatic precipitators are not provided and precipitator dust is not collected.

Since precipitators were provided at submerged-arc electric furnaces operated at NFDC, disclosures in the present invention are especially applicable to precipitator dust stored at this site.

Precipitator dust collected at NFDC was gray, and the bulk of it was extremely fine grained. However, the precipitator dust contained fragments of coke, phosphate ore, and slag. Much of the fine-grained particles were believed to be derived from material volatilized from the furnace; particle size was 2 microns or smaller, but the particles aggregated into loose clusters up to 30 microns in size. Further aggregation into large lumps occurred when precipitator dust was exposed to air.

Gases readily adsorb on surfaces of such small particles. The dry precipitator dust burns spontaneously upon exposure to air; this phenomenon was attributed to combustion of the adsorbed gases, including elemental phosphorus.

The concentration of elemental phosphorus in precipitator dust depends on its temperature. The temperature of dust discharging from the precipitator was measured and the elemental phosphorus content was determined. The relationship is indicated in table 2.

TABLE 2

Effect of Temperature on Elemental Phosphorus Content of Precipitator Dust

| Temperature of precipitator dust discharging from precipitator, °F. | Elemental phosphorus content of precipitator dust, % |
|---|---|
| 450 | 1.3 |
| 500 | 0.9 |
| 550 | 0.7 |
| 600 | 0.4 |
| 650 | 0.3 |
| 700 | 0.1 |
| 750 | 0.1 |
| 800 | <0.1 |

The temperature of gas entering the electrostatic precipitator at NFDC was normally in the range of 650° to 700° F. Temperature of particulates in the gas is expected to be about the same as the gas temperature. Therefore, average concentration of elemental phosphorus in precipitator dust is taken to be in the range of 0.1 to 0.3 percent, as indicated in table 2.

Elemental phosphorus is an acutely toxic chemical and precipitator dust is taken to be a hazardous waste. Some species of marine life are killed when they are exposed to water containing very small concentrations of elemental phosphorus. Toxicity levels have been reported for three species, as shown in table 3.

TABLE 3

Lethal Concentration of Elemental Phosphorus in Water[a]

| Marine specie | Lethal concentration, micrograms/liter |
|---|---|
| Lobster | 40 |
| Salmon | 18 |
| Beach flea | 3–4 |
| Herring | 2.5[b] |

[a]Reference: "Toxicity of Yellow Phosphorus to Herring (*Clupea harengus*), Atlantic Salmon (*Salmo salar*), Lobster (*Homarus Americanus*), and Beach Flea (*Gammorus oceanicus*)," Zitko, V., et al., J. Fisheries Research Board of Canada, vol. 27, No. 1, 1970.
[b]Specific lethal concentration was not determined, but concentrations as low as 2.5 micrograms per liter produced irreversible poisoning.

Table 1 shows that precipitator dust contains about 6.3 percent fluorine. Airborne particles present occupational health hazards, and the airborne particles contribute to air pollution.

The $P_2O_5$ content of precipitator dust is about 27.7 percent. Phosphate ore containing this much $P_2O_5$ would be considered high-grade feedstock. Furthermore, the $P_2O_5$:CaO weight ratio in precipitator dust is 2.0 as compared with a ratio of about 0.7 for some high-grade phosphate ores. It is evident the quantity of slag made when precipitator dust is smelted will be less than the slag made with phosphate ore. Precipitator dust contains ample $SiO_2$ to combine with CaO to form calcium silicate slag. The overall conclusion is that less electric energy would be required to smelt precipitator dust than phosphate ore. However, the physical properties of precipitator dust are not suitable for use as feedstock. The particles must be agglomerated into lumps before they can be smelted in a submerged-arc electric furnace.

A process is disclosed to aggregate particles in precipitator dust by tumbling with a binder followed by induration to harden the aggregates. Thus precipitator dust is converted into feedstock for submerged-arc electric furnaces. Binder for the process can be prepared by reacting acidic phosphorus compounds with alkaline substances. Although the acidic phosphorus compound may be one of several phosphorus oxides which has reacted with water to form an acid, other acidic phosphorus chemicals may also be used. The preferred phosphorus oxide is $P_2O_5$ which reacts with water to form phosphoric acid. Various calcium and magnesium compounds may be used as the alkaline substance, but ground phosphate ore is preferred.

Production of the reaction between phosphoric acid and ground phosphate ore is monocalcium phosphate, and this compound is the preferred binder for agglomeration. Dicalcium phosphate can be used as binder, but the $P_2O_5$:CaO weight ratio would be less than it is in monocalcium phosphate. Dicalcium phosphate can be prepared by reacting phosphoric acid and calcium oxide, or by reacting phosphoric acid and calcium carbonate. The electric energy required to smelt dicalcium phosphate is greater than it is for monocalcium phosphate because of the larger quantity of slag made with the former.

A diagram of the process is shown in the figure. Phosphoric acid is mixed with ground phosphate ore in the reactor. Fluorine compounds and particulates are emitted from the reactor. Mixture shown as 4 in the figure is partially reacted and it is in the form of a slurry. Precipitator dust and slurry are added to tumbler wherein reaction continues. Fluorine compounds and particulates are emitted from tumbler, and some of the elemental phosphorus in precipitator dust is volatilized.

Mixture aggregates into agglomerates in tumbler and agglomerates are discharged into indurator. The agglomerates are heated in the indurator causing the reaction between phosphoric acid and ground phosphate to be completed. Additional elemental phosphorus in precipitator dust is vaporized. Gas from indurator contains fluorine compounds, particulates, and elemental phosphorus. Indurated agglomerates indicated by 19 in the figure is the feedstock prepared from precipitator dust, and it can be fed to a submerged-arc electric furnace for smelting.

Gases from reactor, tumbler, and indurator are combined and treated in a scrubber as indicated in the figure. The scrubbing medium is an aqueous solution having a pH in the range of 5.5 to 6.0. The scrubbing medium is recirculated and its pH will be in the range of 1 to 2 unless an alkaline substance is added to adjust the pH to a higher value. One of several alkaline substances may be used to raise the pH. They include substances such as sodium carbonate, potassium carbonate, anhydrous ammonia, ammonium hydroxide, and ammonium carbonate. Bicarbonates of sodium and potassium are suitable alkaline substances to use to adjust the pH, but liquid anhydrous ammonia is preferred. Vaporization of anhydrous ammonia cools the scrubbing medium, and additional elemental phosphorus is condensed in the scrubber.

A stream of the recirculating scrubbing medium is bled off and replaced by fresh water. This is done to control the concentration of fluorine compounds, particulates, and elemental phosphorus in the scrubbing medium.

Scrubber effluent is used as feedstock for the manufacture of suspension fertilizer wherein effluent is used instead of fresh water. In the manufacture of suspension fertilizer, phosphoric acid is neutralized with ammonia, thereby generating heat which causes the solution to boil. Elemental phosphorus is rapidly oxidized to $P_2O_5$ by the boiling solution. The resulting $P_2O_5$ is hydrated to form phosphoric acid followed by neutralization with ammonia to form ammonium phosphate. Thus the toxic constituent in precipitator dust—elemental phosphorus—is converted into a nutrient.

Steps involved in the process to recycle precipitator dust are given below with explanation to provide a more complete disclosure of the invention.

1. An acidic phosphorus compound is reacted with an alkaline substance to prepare a binder to agglomerate precipitator dust. The preferred acidic phosphorus compound is phosphoric acid and the preferred alkaline substance is ground phosphate ore. Phosphoric acid and ground phosphate ore are combined in proportions required for the preparation of monocalcium phosphate.
2. Precipitator dust is tumbled with a slurry formed by mixing the acidic phosphorus compound with the alkaline substance. Reaction between the two materials begins in the reactor and continues in the tumbler. Agglomerates are formed by tumbling action wherein particles are aggregated by a combination of surface tension forces and bridging by a salt formed when an acid is neutralized with an alkaline substance. When the preferred reacting materials—phosphoric acid and ground phosphate ore—are used, the salt will be monocalcium phosphate monohydrate.
3. Agglomerates formed in 2 above are hardened by heating them in an indurator. Reaction between phosphoric acid and ground phosphate ore is driven to completion by heating. Agglomerates are desiccated and discrete particles are held together by salt bridges. A temperature of about 220° F. drives the reaction between phosphoric acid and ground phosphate ore to completion. Also, water of hydration in monocalcium phosphate monohydrate is volatilized by heating to 220° F. An induration temperature of 220° F. is taken as the lower limit. Precipitator dust may contain carbon carried over from the electric furnace and the carbon will reduce calcium phosphate beginning at about 1000° C., or 1832° F. The upper temperature limit for induration is taken to be about 1800° F. Therefore, temperature limits for induration are 220° to 1832° F., but the preferred temperature range is 550° to 600° F.
4. Gases emitted from reactor, tumbler, and indurator are contacted with an aqueous scrubbing medium to condense elemental phosphorus, to absorb fluorine compounds, and to collect entrained particulates. When the pH is in the range of 5.5 to 6.0, or higher, fluorine compounds are readily absorbed. But pH values greater than about 6.0 will result in large ammonia losses in the stack gas.
5. The scrubbing medium is recirculated as described above. Elemental phosphorus, fluorine compounds, and particulates accumulate as a result of recirculation. A stream of the recirculating scrubbing medium is bled off and replaced with fresh water to prevent excessive concentrations of elemental phosphorus, fluorine compounds, and particulates. The bleedoff is used as feedstock for the production of suspension fertilizer wherein water is required in the manufacturing process. Thus water required for production of the fertilizer is derived from water added to the scrubbing medium in step 4. Elemental phosphorus in the bleedoff is oxidized to form $P_2O_5$ which is hydrated to phosphoric acid, and the phosphoric acid is neutralized with ammonia to form ammonium phosphate.
6. Hardened agglomerates from step 3 are smelted in a submerged-arc electric furnace to produce elemental phosphorus.

PRIOR ART

A search of the art was made before submitting patent application 651,589 on Sept. 17, 1984. The search disclosed the following patents on subjects relating to the present application.

U.S. Pat. No. 2,040,081, Mar. 12, 1936, Harry A. Curtis. A process is disclosed for the agglomeration of finely ground phosphate in a pug mill.

U.S. Pat. No. 3,034,883, May 15, 1962, T. P. Hignett, Alvin B. Phillips and Ronald D. Young. A process is disclosed for the agglomeration of a fertilizer mixture where superphosphate is the binder.

U.S. Pat. No. 3,202,744, Aug. 24, 1965, J. C. Barber, George H. Megar and Thomas S. Sloan. Phosphorus sludge is used as binder to briquet phosphorus furnace feed.

U.S. Pat. No. 3,335,094, Aug. 8, 1967, W. J. Darby. This is a process for preparing a briquetted mixture of phosphate, silica, and coke having a high electrical resistance.

U.S. Pat. No. 3,531,250, Sept. 29, 1970, Arnulf Hinz, Heinz Harnish, and Hans Werner Aiegler. Phosphorus sludge is utilized to make elemental phosphorus. The sludge is mixed with phosphate rock and the mixture is dried and agglomerated by any of the usual methods.

U.S. Pat. No. 2,267,077, Dec. 23, 1941, George W. Burke. Dense, hard cakes of phosphorus sludge are formed. The cakes are subjected to heat to vaporize the phosphorus.

U.S. Pat. No. 4,372,929, Feb. 8, 1983, James C. Barber. A process is disclosed for agglomerating discrete particles of phosphate ore. A mineral acid, an alkaline fluid and water are added to the phosphate ore and the mixture is tumbled to form agglomerates. The agglomerates are indurated by heating at a temperature in the range of 120° to 150° C.

U.S. Pat. No. 4,373,893, Feb. 15, 1983, James C. Barber. A bench-scale apparatus is described for agglomerating discrete particles. A mineral acid, an alkaline fluid and water are tumbled in the bench-scale apparatus to form the agglomerates.

U.S. Pat. No. 4,421,521, Dec. 20, 1983, James C. Barber. Carbon particles are agglomerated for use as a reducing carbon in phosphorus furnaces. A mineral acid, an alkaline fluid and water are tumbled in a rotating cylinder to form agglomerates. The agglomerates are indurated by heating in the temperature range of 120° to 150° C.

U.S. Pat. No. 3,076,248, Feb. 5, 1963, Wendell L. Darrow and Joseph W. Kass. Phosphate agglomerates are prepared and said agglomerates are heated for 15 to 25 minutes in the temperature range of 2250° to 2500° F.

U.S. Pat. No. 3,760,048, Sept. 18, 1973, James K. Sullivan and Richard I. Howard. Calcined agglomerates are prepared from western phosphate shale. The ore is crushed and agglomerated by briquetting followed by drying for 15 minutes in the temperature range of 2000° to 2500° F. on a nonagitated grate.

U.S. Pat. No. 3,522,338, July 28, 1970, Theodore E. Kass and Robert J. Gleason. Granular calcium phosphate ore containing silica is agglomerated by the hot briquetting process. The mixture is calcined in the temperature range of 1400° to 1900° F. prior to briquetting.

Two patents, U.S. Pat. No. 4,529,439, July 16, 1985, and U.S. Pat No. 4,670,240, June 2, 1987, were issued as a result of patent application Ser. No. 651,589. In examination of patent applications, the U.S. Patent and Trademark Office found the following patents relating to recovery of phosphorus-containing wastes.

U.S. Pat. No. 3,104,952, Sept. 24, 1963, Rufus G. Hartig. Phosphoric acid is added to phosphorus sludge and the mixture is steam distilled. A gaseous mixture is obtained by distillation which is comprised of steam and elemental phosphorus.

U.S. Pat. No. 4,481,176, Nov. 6, 1984, David L. Dodson, Bruce D. Pate, and Philip C. Rogers. The size of particles in phosphorus sludge is reduced and the sludge is filtered to recover phosphorus.

Patent application Ser. No. 728,620 was filed Apr. 29, 1985. Two patents were referred to which relate to the recovery of phosphorus-containing wastes.

U.S. Pat. No. 4,081,333, Mar. 28, 1978, William Samuel Holmes, Edward James Lowe, and Ernest Reginal Brazier. An apparatus is described for distilling phosphorus sludge. Molten lead is used as the heating medium.

U.S. Pat. No. 4,492,627, Jan. 8, 1985, David A. Crea. A process is disclosed for the recovery of elemental phosphorus from waste ponds.

Application Ser. No. 728,620 resulted in the issuance of the following patents.

U.S. Pat. No. 4,608,241, Aug. 26, 1986, James C. Barber.

U.S. Pat. No. 4,649,035, Mar. 10, 1987, James C. Barber.

U.S. Pat. No. 4,656,020, Apr. 7, 1987, James C. Barber.

Prior art in patents listed above relates to subject invention. When application Ser. No. 728,620 was examined the following patents were cited for information on recovery of phosphorus-containing solids.

Great Britain No. 981,420, Jan. 27, 1965, Edward James Lowe. Invention is a process for distilling phosphorus sludge at reduced pressure to avoid high temperatures.

U.S. Pat. No. 3,531,250, Sept. 29, 1970, Arnulf Hinz. Sludge formed by dressing phosphate ores with mineral acids is mixed with finely ground phosphate ore and the resulting mixture is used for making shapes suitable for smelting in an electric furnace. The phosphate sludge can be used alone or precipitator dust can be added. The shapes may first be dried or they may be sintered and then smelted to produce elemental phosphorus.

Canadian Pat. No. 956,433, Oct. 22, 1974, William B. Dancy. A method is disclosed for the production of elemental phosphorus and tricalcium phosphate by the thermal reduction of monocalcium phosphate.

U.S. Pat. No. 3,923,961, Dec. 2, 1975, William B. Dancy. Elemental phosphorus and animal feed grade tricalcium orthophosphate are produced by thermal reduction of monocalcium phosphate in a conventional rotary or fluosolids kiln by admixing the phosphate with an excess of carbon, forming the mixture into briquettes or pellets, heating the briquettes rapidly to a temperature of about 2100° to 2400° F., and recovering the phosphorus vapors and the tricalcium orthophosphate as residue.

U.S. Pat. No. 4,451,277, May 29, 1984, James C. Barber. Processes and compositions of matter are disclosed for the production of liquid fertilizers wherein wastewater from phosphorus smelting is incorporated in liquid fertilizer processes. The wastewater replaces water evaporated and the wastewater dissolves fertilizer salts.

Russian Pat. No. 850,576, Feb. 6, 1977. Crude phosphorite can be granulated for production of elemental phosphorus by mixing phosphorite ore fines with powdered ferrophosphate then with an aqueous suspension containing dust from a Cottrell precipitator and some sodium polyphosphate. The mixture is granulated, dried, and calcined. Ferrophosphate is applied to the surface of the granules.

Additional inventions for processes to recover waste streams in fluid fertilizers are disclosed in the following patents.

U.S. Pat. No. 4,383,847, May 17, 1983, James C. Barber. Wastewater containing elemental phosphorus is added to fluid fertilizer for recovery.

U.S. Pat. No. 4,514,366, Apr. 30, 1985, James C. Barber. Wastewater from a phosphorus smelting furnace is incorporated in liquid fertilizer processes.

Publications provide information relating to precipitator dust and wastewater recovery. These publications are given below.

Tennessee Valley Authority, Chemical Engineering Report No. 3, 1952, R. B. Burt and James C. Barber. The report is entitled "Production of Elemental Phosphorus by the Electric-Furnace Method."

Chapter VII.2 from the book "Solid Wastes" edited by C. L. Mantell, John Wiley and Sons, Inc. The chapter is entitled "Solid Wastes from Phosphorus Production."

"A Waste Recovery Story," James C. Barber, Charles B. Hendrix, and David C. Mussleman, CHEMTECH, May 1986.

DESCRIPTION OF THE DRAWING

A single drawing is included to illustrate conversion of precipitator dust into feedstock for the production of elemental phosphorus. In the drawing 1 is phosphoric acid and 2 is small sized phosphate ore. The two materials are partially reacted in reactor 3 forming slurry 4 which contains monocalcium phosphate monohydrate. Slurry 4 is fed to tumbler 5.

Precipitator dust 6 is fed to tumbler 5, and mixture of precipitator dust 6 and slurry 4 is tumbled to aggregate small sized precipitator dust. Effluent gases from reactor 3, tumbler 5, and indurator 18 are designated by 7. Elemental phosphorus is vaporized in tumbler 5 and indurator 18 and it is a constituent in effluent gases. Gas streams from reactor 3, tumbler 5, and indurator 18 are combined and the gas is treated in scrubber 8. Water 9 is added to recirculating scrubbing medium as makeup. Elemental phosphorus in gases is condensed in scrubber 8; fluorine compounds in gases are absorbed; and entrained particulates are collected. Treated gases are discharged through stack 10.

Stream 11 is bleedoff from recirculating scrubbing medium. Stream 11 is added to suspension fertilizer unit 12. Suspension fertilizer requires water for its manufacture, and water in bleedoff 11 is used instead of fresh water. Thus water shown as 9 is source of water for manufacture of suspension fertilizer. Other materials used to manufacture suspension fertilizer are phosphoric acid 13, ammonia 14, and clay 15. Phosphoric acid is neutralized with ammonia and heat of reaction causes liquid mixture in suspension fertilizer unit to boil. Neutralization of phosphoric acid with ammonia results in the formation of ammonium phosphate. When the solution is cooled, ammonium phosphate crystals precipitate; clay 15 retards crystal settling, and suspension fertilizer 16 is produced.

Stream 11 contains fluorine compounds, elemental phosphorus, and suspended solids. Fluorine compounds affect the crystal habit of ammonium phosphate, and small sized crystals are formed. Quality of suspension fertilizer is thereby improved by fluorine compounds volatilized from reactor 3, tumbler 5, and indurator 18. Elemental phosphorus in bleedoff 11 is oxidized in suspension fertilizer unit 12 forming phosphoric acid, and this acid is neutralized with ammonia 14. Thus, elemental phosphorus in precipitator dust augments ammonium phosphate constituent of suspension fertilizer 16.

Agglomerates 17 formed in tumbler 5 are hardened by heating in indurator 18 to prepare material suitable for smelting in a submerged-arc electric furnace. However, electric furnace is not shown in the figure.

OBJECTS OF THE INVENTION

Objects of the invention are to:
1. Recycle precipitator dust stored at the NFDC.
2. Convert precipitator dust into feedstock suitable for smelting in a submerged-arc electric furnace.
3. Recover elemental phosphorus and fluorine compounds volatilized during the preparation of feedstock from precipitator dust.
4. Produce elemental phosphorus by smelting precipitator dust in a submerged-arc electric furnace.

EXAMPLE I

In the present example the process for the commercial production of triple superphosphate fertilizer by the storage-curing method is described. Phosphate ore mined in Tennessee was beneficiated by washing to obtain phosphate containing 24.2 percent $P_2O_5$. The phosphate was ground to a particle size of about 80 percent minus 200 mesh.

The ground phosphate was reacted with 75 percent phosphoric acid in a continuous mixer such as that described in the book, "Superphosphate: Its History, Chemistry, and Manufacture," U.S. Department of Agriculture and the Tennessee Valley Authority, December 1964, pages 202 and 203. The mixer is called the TVA cone mixer. Ground phosphate ore and phosphoric acid were mixed in proportions to provide a $P_2O_5$:CaO mole ratio of 0.93 in the fertilizer product. The weight ratio $P_2O_5$ from acid:$P_2O_5$ from phosphate ore was 2.02.

The freshly mixed material was discharged onto a conveyor belt. The layer of material on the belt was scored with knives and the scored material was disintegrated by a squirrel-cage disintegrator. Freshly mixed triple superphosphate was stored or cured 28 days to provide time for the reactions to proceed nearly to completion. After curing, the reacted material was crushed, bagged, and distributed on agricultural land as triple superphosphate fertilizer. Analysis of the fertilizer was as follows: moisture, 4.0 percent; total $P_2O_5$, 41.1 percent; $P_2O_5$ present as free acid, 1.3 percent; CaO, 17.5 percent; and F, 1.48 percent. The principal constituent in triple superphosphate fertilizer was monocalcium phosphate monohydrate.

EXAMPLE II

Triple superphosphate fertilizer was made by the process described in example I except that beneficiated Tennessee phosphate ore contained 35.0 percent $P_2O_5$. Ground phosphate ore was mixed with 75 percent phosphoric acid in the TVA cone mixer in proportions for a $P_2O_5$:CaO mole ratio of 0.93 in the fertilizer. The weight ratio $P_2O_5$ from acid:$P_2O_5$ from phosphate was 2.31. After curing 28 days the fertilizer had the following analysis: moisture, 1.7 percent; total $P_2O_5$, 51.1 percent; $P_2O_5$ present as free acid, 0.4 percent; CaO, 21.5 percent: and F, 1.63 percent. As in example I, the principal constituent in the fertilizer was monocalcium phosphate monohydrate.

EXAMPLE III

In the present example the process for the commercial production of triple superphosphate fertilizer by the quick-curing process is described.

Since reaction between ground phosphate and phosphoric acid is not completed in the mixer, a large proportion of $P_2O_5$ is present as free acid. In examples I and II the freshly mixed material is stored about 28 days in order for the reaction to approach completion. The percent $P_2O_5$ present as free acid was 1.3 for example I and 0.4 percent for example II.

The freshly mixed material can be cured by heating and the storage period is thereby avoided. The principal effects of curing fresh superphosphate are to decrease moisture and free acid $P_2O_5$ with resultant increase in conversion of $P_2O_5$ to the soluble form needed for fertilizers. These effects are obtained by drying as well as by storage. When fresh superphosphate is cured by heating, the process is called quick curing.

In the book, "Development of Processes for Production of Concentrated Superphosphate," Chemical Engineering Report No. 5, Tennessee Valley Authority, 1949, G. L. Bridger (CER No. 5) the conditions for quick-curing triple superphosphate were recommended and they are given in table 4.

TABLE 4

Recommended Conditions for Production of Triple Superphosphate Fertilizer by the Quick-Curing Process

| Mixing conditions | |
|---|---|
| Phosphoric acid concentration, % $H_3PO_4$ | 68 |
| Phosphoric acid temperature, °F. | 100 |
| Acidulation ($P_2O_5$:CaO mole ratio) | 0.93 |
| Type of mixer | Continuous |
| Mixer-belt retention time | 6 minutes |
| Disintegration of fresh superphosphate | Battery of 4 squirrel-cage disintegrators |
| Curing conditions | |
| Rotary dryer with flights | Direct-fired, countercurrent operation |
| Dryer loading, percent | 14 |
| Maximum gas velocity in dryer, ft./sec. (actual conditions) | 5 |
| Dryer retention time, hr. | 2.8 |
| Gas-to-feed ratio, c.f.m. (at 100° F. N.P.) (lb. feed)(hr.) | 1.1 |

Under conditions given in table 4 it is expected moisture content of the fertilizer will be about 3 percent and the percent $P_2O_5$ present as free acid will be less than 3 percent.

EXAMPLE IV

In the manufacture of fertilizers, aggregates are commonly prepared by the use of a fertilizer salt as a binder. For example, granular ammonium phosphate fertilizer is prepared by the following steps.
1. Phosphoric acid is partially neutralized with ammonia. A slurry is formed which is comprised of ammonium phosphate crystals and water.
2. Slurry is tumbled and additional ammonia is sparged in bed of tumbling material to complete neutralization of phosphoric acid. Solid particles are aggregated into granules.
3. Granules are dried and indurated by heating. In the preparation of the granules, ammonium phosphate is the binder when the solid particles are aggregated.

EXAMPLE V

Coke fines were agglomerated by a procedure similar to that described in example IV. A mixture having the following composition was tumbled in a rotating cylinder.
440 grams of wet coke fines (405 grams on a dry basis)
120 grams of sludge acid (impure phosphoric acid)
99 grams of aqua ammonia (29% $NH_3$)
100 grams of water The phosphoric acid was neutralized with ammonia. The resulting ammonium phosphate salt served as binder. Coke particles were aggregated by tumbling in a cylinder and the material was agglomerated.

Granular triple superphosphate fertilizer was prepared by a similar process, but monocalcium phosphate monohydrate was the binder. The granules are hardened by heating in the quick-curing process.

EXAMPLE VI

Monocalcium phosphate monohydrate was heated in laboratory experiments to identify the observed heat effects with changes in composition. The monocalcium phosphate was continuously heated to a temperature of 842° F. at a heating rate of 9° F. per minute.

A diagram of the laboratory apparatus used in the experiments is shown in CER No. 5, FIG. 68. And results of the experiments are given in FIG. 70.

The experiments showed weight loss beginning at about 250° F. This loss probably indicates loss of water of hydration. Handbook data show water of hydration is lost at about 212° F. When a temperature of 800° F. was reached the three moles of water associated with monocalcium phosphate monohydrate had been lost and monocalcium phosphate monohydrate had been converted to calcium metaphosphate ($CaO.P_2O_5$)

Combined water in phosphorus furnace feedstock adversely affects the operation as follows.
1. The water combines with carbon, as shown by the reaction, $H_2O + C = H_2 + CO$.

Since carbon is normally supplied as coke, the coke consumption will be increased by combined water.
2. Volatilization of combined water is an endothermic reaction and electric energy consumption is increased.
3. Electric energy is consumed by the endothermic reaction given in 1. However, $H_2$ and CO formed by the reaction can be used as fuel and part of the energy can be recovered.

Laboratory experiments have shown that phosphorus furnace feedstock agglomerated by use of monocalcium phosphate monohydrate binder requires heating to harden the agglomerates. From data reported in CER No. 5 it is evident agglomerates should be heated to a temperature of at least 800° F. if minimum coke and electric energy requirements are to be realized.

EXAMPLE VII

Laboratory experiments were made to determine how much fluorine is volatilized when triple superphosphate is heated. Results of the experiments were reported in CER No. 5, table XXX. Data in table 5 were extracted from results reported in CER No. 5.

TABLE 5

| | Fluorine Volatilization Resulting from Heating Triple Superphosphate | | | | | | |
|---|---|---|---|---|---|---|---|
| $P_2O_5$:CaO mole ratio | Curing time before heating | Temp., °F. | Heating time, hr. | Composition of product, % | | | F volatilization, % of F in phosphate ore |
| | | | | $P_2O_5$ | CaO | F | |
| $P_2O_5$:CaO mole ratio 0.90–0.93 | | | | | | | |
| 0.92 | a | a | 0 | 48.0 | 20.6 | 1.51 | 4 |
| 0.93 | a | a | 0 | 49.0 | 21.0 | — | — |
| 0.91 | 1 mo. | 392 | 2 | 56.1 | 24.3 | 0.98 | 47 |
| 0.93 | 1 day | 572 | 0.25 | 59.4 | 25.3 | 0.86 | 55 |
| 0.92 | 1 day | 572 | 0.5 | 59.6 | 25.7 | 0.81 | 58 |
| 0.91 | 1 day | 572 | 0.75 | 50.8 | 25.9 | 0.78 | 60 |
| 0.91 | 1 day | 572 | 1 | 60.0 | 26.0 | 0.76 | 61 |
| 0.90 | 1 day | 572 | 2 | 60.2 | 26.3 | 0.67 | 66 |
| 0.90 | 3 min. | 932 | 2 | 62.0 | 27.2 | 0.75 | 64 |
| 0.93 | 1 day | 932 | 2 | 63.0 | 26.8 | 0.31 | 85 |
| 0.92 | 1 mo. | 932 | 2 | 62.4 | 26.7 | 0.29 | 86 |
| 0.90 | 1 mo. | 1742 | 2 | 62.9 | 27.6 | 0.10 | 95 |
| $P_2O_5$:CaO mole ratio 0.93–0.98 | | | | | | | |
| 0.98 | a | a | 0 | 47.6 | 19.1 | 1.51 | — |
| 0.94 | a | a | 0 | 47.6 | 19.1 | 1.51 | 1 |
| 0.95 | 1 day | 392 | 0.25 | 54.4 | 22.7 | 0.88 | 49 |
| 0.94 | 1 day | 392 | 0.5 | 55.6 | 23.3 | 0.86 | 51 |
| 0.94 | 1 day | 392 | 0.75 | 56.0 | 23.5 | 0.86 | 52 |
| 0.93 | 1 day | 392 | 1 | 56.4 | 23.9 | 0.86 | 52 |
| 0.94 | 1 day | 392 | 2 | 56.8 | 24.0 | 0.84 | 54 |
| 0.94 | 3 min. | 572 | 1 | 59.4 | 25.0 | 0.90 | 53 |
| 0.94 | 1 mo. | 572 | 1 | 59.4 | 24.9 | 0.62 | 67 |
| 0.93 | 1 mo. | 572 | 2 | 59.6 | 22.1 | 0.57 | 70 |

TABLE 5-continued

Fluorine Volatilization Resulting from Heating Triple Superphosphate

| $P_2O_5$:CaO mole ratio | Curing time before heating | Temp., °F. | Heating time, hr. | Composition of product, % | | | F volatilization, % of F in phosphate ore |
|---|---|---|---|---|---|---|---|
| | | | | $P_2O_5$ | CaO | F | |
| 0.94 | 2 mo. | 932 | 2 | 63.5 | 26.7 | 0.23 | 89 |
| 0.98 | 3 min. | 1247 | 2 | 64.2 | 25.9 | 0.52 | 74 |
| 0.96 | 3 min. | 1742 | 2 | 64.5 | 26.6 | 0.33 | 83 |
| 0.97 | 1 day | 1742 | 2 | 65.0 | 26.6 | 0.19 | 91 |

*a*Mixture was not heated.

Conclusions reached from the experiments are given on pages 118 and 120 in CER No. 5, and they are given below.

The present work showed 3 days' heating of monocalcium phosphate monohydrate at 392° F. drove off approximately 2 of the 3 molecules of water initially present in each molecule of the monohydrate. The loss of the final molecule of water in heating monocalcium phosphate monohydrate at 482° or 500° F. was slow, but the loss occurred rapidly at 572° F. At temperatures above 572° F., constancy of weight within 0.2 percent was attained in 8 to 12 hours' heating. As the temperature was raised to 932° to 1292° F., the weight loss increased to a maximum of about 22.5 percent. Since the monocalcium phosphate monohydrate as analyzed contained 21.4 percent $H_2O$ (determined by difference), the loss in excess of this amount presumably represented volatilization of $P_2O_5$. Precise determinations of the $P_2O_5$ and CaO in products of dehydration showed that on the basis of the CaO balance, 1.0, 1.1, to 1.2, and 1.5 percent, respectively, of the $P_2O_5$ content of the monocalcium phosphate monohydrate was volatilized in prolonged heating at 482°, 680°, and 788° F. The $P_2O_5$ loss did not show a direct relationship to the time of heating. This suggests that the $P_2O_5$ loss occurred simultaneously with the initial rapid loss of water.

Table 5 shows that more than half of the fluorine is volatilized when triple superphosphate is heated to about 800° F. However, heating resulted in $P_2O_5$ loss, and phosphorus furnace feedstock agglomerated with monocalcium phosphate binder may undergo greater loss of $P_2O_5$ if the material is heated to temperatures higher than 800° F.

From information reported in CER No. 5, it was concluded that precipitator dust agglomerated with monocalcium phosphate monohydrate binder should be indurated by heating in the temperature range of 550° to 800° F.

EXAMPLE VIII

When precipitator dust is agglomerated and the agglomerates are indurated by heating, fluorine will be volatilized as discussed in example VII. Gases from the continuous mixer, the agglomerator, and the indurator must be scrubbed to recover the fluorine and prevent air pollution. Water is used as the scrubbing medium to recover fluorine compounds, as indicated by 9 in the figure.

Precipitator dust contains elemental phosphorus and it will be volatilized when the agglomerates are indurated. Some of the elemental phosphorus will be oxidized in the vapor phase, but oxidation may not be complete, and elemental phosphorus may be condensed in the scrubber. Therefore, scrubber effluent may contain elemental phosphorus.

In the present example a process is offered for recovery of scrubber effluent wherein the effluent is used as feedstock to produce suspension fertilizer.

Orthophosphate suspension fertilizer is made by neutralizing merchant-grade wet-process phosphoric acid with ammonia. Water is added to the reaction vessel to replace the water lost by evaporation and to provide sufficient fluid to solubilize most of the solid ammonium phosphate.

Scrubber effluent can be used as feedstock instead of fresh water. Any elemental phosphorus in the effluent is oxidized during agitation of the hot solution and is converted to phosphoric acid. Fluorine compounds are incorporated in the suspension fertilizer and discharge of these polluting chemicals as an aqueous waste is thereby avoided.

EXAMPLE IX

Another process for making suspension fertilizer is to dissolve ammonium phosphate fertilizers in water. When monoammonium phosphate fertilizer is being dissolved in water, temperature of the mixture is elevated by adding ammonia. The ammonia combines with monoammonium phosphate and the exothermic reaction increases the temperature. Monoammonium phosphate is dissolved at a higher rate when the temperature is increased.

The mixture of monoammonium phosphate fertilizer, water, and ammonia is vigorously agitated. Upon cooling, ammonium phosphate crystals precipitate. A suspending clay is added to retard settling of the crystals, thereby making a suspension fertilizer.

Ammonium polyphosphate fertilizer can be dissolved in water to produce a suspension fertilizer. The process is similar to that described above for monoammonium phosphate fertilizer.

When diammonium phosphate fertilizers are dissolved in water, both phosphoric acid and ammonia are added to increase the temperature of the mixture. The reaction between ammonia and diammonium phosphate does not increase the temperature enough to dissolve the diammonium phosphate at a rapid rate. As with monoammonium phosphate, the mixture is vigorously agitated, ammonium phosphate crytals precipitate upon cooling, and a suspending clay is added to retard settling of the crystals, thus making suspension fertilizer.

As described in example VIII, scrubber effluent is used as feedstock instead of fresh water. Ammonium phosphate fertilizers are dissolved in scrubber effluent to make suspension fertilizer.

EXAMPLE X

Dry precipitator dust was agglomerated in a combination conveyor-pug mill. The ribbon conveyor served as a mixer and after mixing the material was discharged into a pug mill for agglomeration. The pug mill was equipped with water sprays.

The ribbon conveyor was 10 feet long and 12 inches in diameter. The pug mill was 6 feet long and 12 inches in diameter. It operated on the same shaft as the ribbon conveyor.

Sufficient water was sprayed into the pug mill to make a stiff mud. The agglomerated dust contained approximately 30 percent water. Agglomerated material was stored 5 to 13 days after which substantial reduction in moisture content occurred. For example, storage of agglomerated precipitator dust in a pan for 13 days reduced the moisture content from 25.0 percent to 1.1 percent.

EXAMPLE XI

Precipitator dust was agglomerated by tumbling in a rotating cylinder. Material in the cylinder was sprayed with water to obtain a moisture content of 27.0 percent. Agglomerates were indurated by storing 7 days in an open pan. After storage the moisture content was 1.1 percent.

It is assumed freshly made agglomerates can be indurated by heating in a nonagitated dryer. Based on strength of air-dried material, it is expected that heating will result in agglomerates suitable for use as feedstock for the production of elemental phosphorus. In this case, binder would be formed by reaction between $P_2O_5$ and CaO constituents in the precipitator dust.

Having thus described the invention, what is claimed is:

1. A process for the production furnace feedstock, said process comprised of the following steps:
   (a) agglomerating precipitator dust containing elemental phosphorus by tumbling with a binder formed by reacting phosphoric acid with finely divided phosphate ore;
   (b) indurating agglomerates formed in step (a) by heating at a temperature of 220 to 1832 degrees F.;
   (c) scrubbing gases discharged from steps (a) and (b) thus obtaining a scrubber effluent containing fluorine compounds, particulates and elemental phosphorus;
   (d) using scrubber effluent from step (c) as feedstock for the production of suspension fertilizer; and
   (e) transporting indurated agglomerates from step (b) to a facility for the production of elemental phosphorus.

2. The process of claim 1, step (a), wherein the acidic phosphorus compound is the $P_2O_5$ constituent of precipitator dust and the alkaline substance is the CaO constituent in precipitator dust.

3. The process of claim 1 wherein agglomerates formed in step (a) are indurated in step (b) by heating in the temperature range of about 550° to about 800° F.

4. The process of claim 1 wherein agglomerates formed in step (a) are indurated in step (b) by heating in the temperature range of about 300° to about 550° F.

5. The process of claim 1, step (d), wherein scrubber effluent is used as feedstock for production of orthophosphate suspension fertilizers.

6. The process of claim 1 wherein ammonium phosphate fertilizer is dissolved in scrubber effluent of step (d).

7. The process of claim 1 wherein said elemental phosphorus is present in the precipitator dust in an amount of about 0.1 to 0.3 weight percent.

8. The process of claim 1 wherein the medium used to scrub gases in (c.) is an aqueous solution having a pH of about 5.5 to 6.0.

* * * * *